Figure 1:
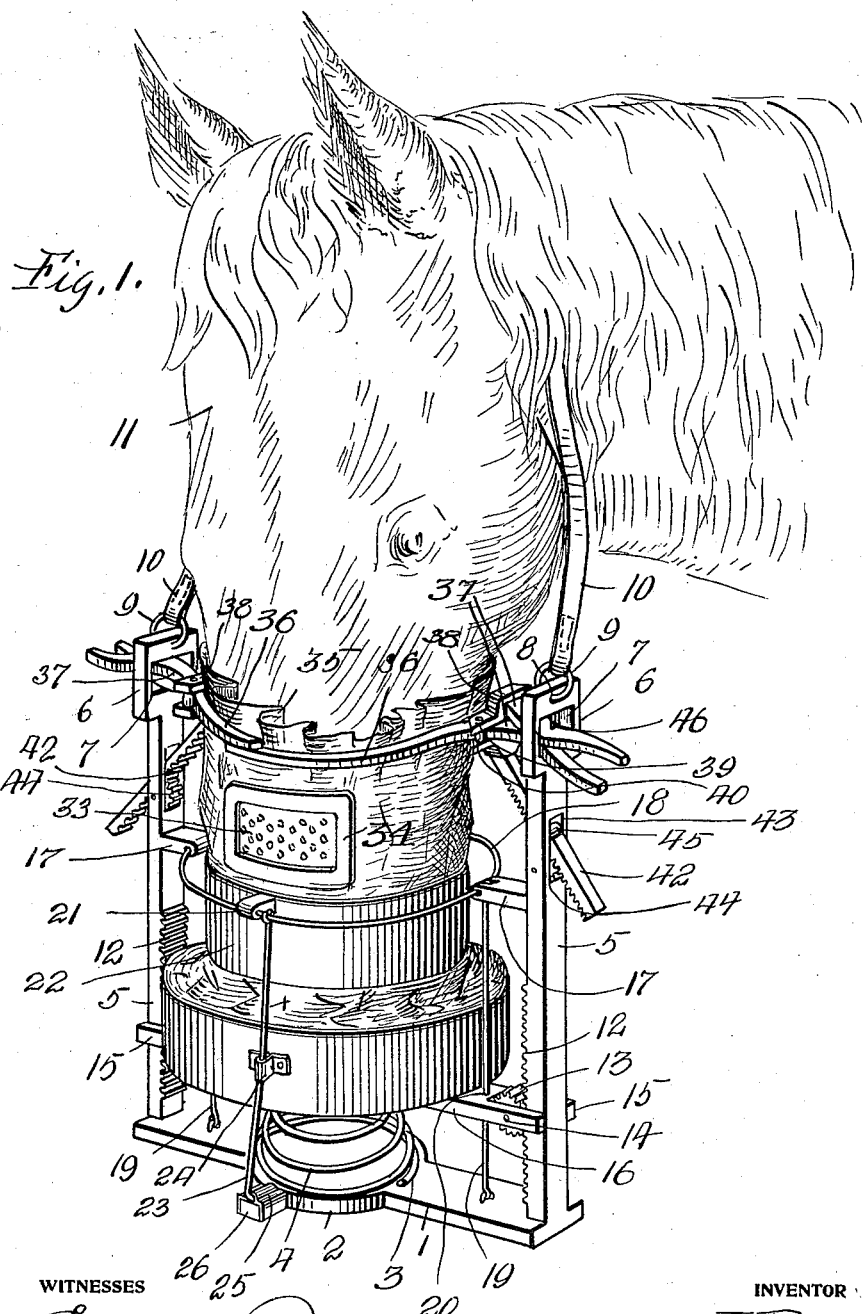

J. REGECZI.
FEED BAG.
APPLICATION FILED OCT. 2, 1911.

1,023,681.

Patented Apr. 16, 1912.

2 SHEETS—SHEET 1.

WITNESSES

INVENTOR
J. Regeczi
BY
ATTORNEYS

J. REGECZI.
FEED BAG.
APPLICATION FILED OCT. 2, 1911.
1,023,681.
Patented Apr. 16, 1912.
2 SHEETS—SHEET 2.
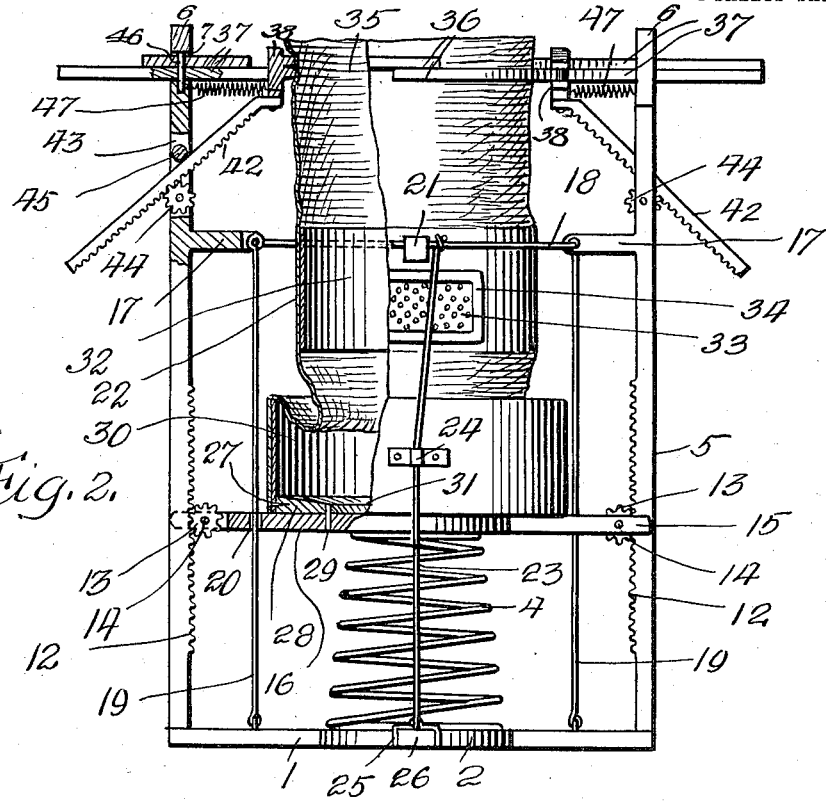
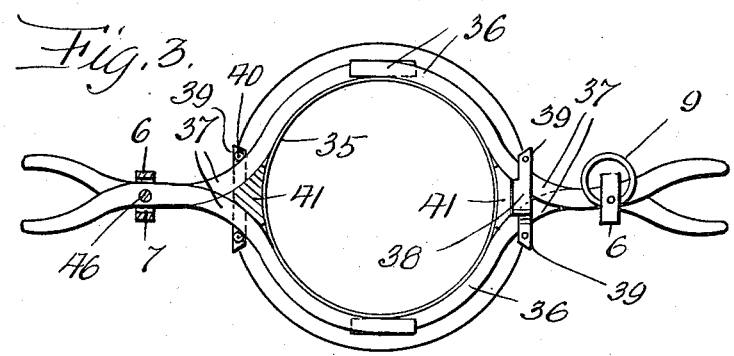
WITNESSES
Samuel Payne
INVENTOR
J. Regeczi.
BY
ATTORNEYS.

UNITED STATES PATENT OFFICE.

JOSEPH REGECZI, OF IRONWOOD, MICHIGAN.

FEED-BAG.

1,023,681.  Specification of Letters Patent.  Patented Apr. 16, 1912.

Application filed October 2, 1911. Serial No. 652,238.

*To all whom it may concern:*

Be it known that I, JOSEPH REGECZI, a subject of the King of Hungary, residing at Ironwood, in the county of Gogebic and State of Michigan, have invented certain new and useful Improvements in Feed-Bags, of which the following is a specification, reference being had therein to the accompanying drawing.

This invention relates to feed bags, and the primary object of my invention is to provide a feed bag support with novel means for clamping the upper end of the bag upon a horse's nose, whereby food will not be spilled while the horse is feeding.

Another object of this invention is to provide a feed bag support with novel means for elevating the bottom of the bag, whereby the feed within the bag can be easily obtained as it is consumed.

A further object of my invention is to provide a feed bag that is ventilated and constructed in such a manner that the bag can be readily adjusted to a horse's nose.

With the above and other objects in view, the invention resides in the novel construction, combination and arrangement of parts to be hereinafter specifically described and then claimed.

Reference will now be had to the drawing, wherein:—

Figure 1 is a perspective view of the feed bag as applied to a horse's head, Fig. 2 is a side elevation of the bag, partly broken away and partly in section, Fig. 3 is a plan of a portion of the feed bag, and Fig. 4 is a perspective view of a portion of one of the coupling members forming part of the bag.

A feed bag in accordance with this invention comprises a transverse base plate 1 having a central enlarged portion 2 providing a support for the lower convolution 3 of a spiral compression spring 4. The ends of the base plate 1 are provided with uprights 5 having the upper ends thereof terminating in heads 6 and having openings 7 for a purpose that will presently appear. The heads 6 have small openings 8 for links 9 to which are attached the ends of a head strap 10. The head strap is adapted to hold the feed bag support in position upon a horse's head 11. The uprights 5 have the inner sides thereof, adjacent to the lower ends, provided with racks 12 and meshing with said racks are pinions 13 revolubly mounted by pins 14 in the bifurcated ends 15 of a cross head 16.

The inner sides of the uprights 5 are provided with inwardly projecting arms 17 supporting a ring 18 and this ring is connected to the base plate 1 by vertical rods 19, said rods having the ends thereof extending into the bifurcated ends of the arms 17. The rods 19 extend through openings 20 provided therefor in the cross head 16, said rods serving functionally as guides for vertical movement of said cross head. The ring 18 extends through apertured lugs 21, carried by the casing 22 of a feed bag, and connected to said ring, adjacent to the lugs 21 are the upper ends of rods 23 that extend through straps 24, carried by the lower end of the casing 22. The lower ends of the rods 23 are connected to straps 25, carried by oppositely disposed extensions 26 of the base plate 1. The lower end of the casing 22 is connected to the cross head 16, as at 29. Interposed between the edges of the bottom plate 28 and the lower end of the casing 22 is a cylindrical shell 30 that maintains a compartment in the lower end of the casing 22. The bottom plate 28 has a central opening 31 with the walls thereof beveled, said opening allowing feed to accumulate centrally of the bottom plate. The cross head 16 is an enlarged portion which closes the opening 31 in the bottom plate 28. The casing 22 has another cylindrical shell 32 maintaining an opening in said casing, said casing and said shell being cut away to accommodate a screen or perforated plate 33 that is retained in engagement with the casing 22 by a frame 34. The screen 33 insures ventilation within the feed bag.

The casing 22 is made of canvas or other flexible material and the upper end thereof is gathered, as at 35 to fit the nose of a horse's head. The gathered end is retained in engagement with the head 11 by the overlapping curved ends 36 of levers 37. The outer ends of these levers extend through coupling members 38 and through the openings 7 of the heads 6. The coupling members 38 have sets of arms 39 arranged in parallelism and revolubly mounted between said arms are rollers 40, these rollers retaining the outer ends of the levers 37 in engagement with the coupling members. Each coupling member has a triangular-shaped spacing block 41, said blocks retaining the levers in engagement with the rollers 40. The coupling members 38 have angularly disposed rack bars 42 extending through openings 43 provided therefor in the upper ends of the uprights 5. The rack bars mesh with pinions 44 revolubly mounted in the openings 43, and said rack bars are retained in engagement with the pinions 44 by revoluble rollers 45 arranged in the openings 43. The outer ends of the levers 37 are pivotally mounted by pins 46 in the openings 7 of the heads 6, and said heads are connected to the coupling members 38 by coiled compression springs 47. These springs normally hold the curved ends 36 of the levers in engagement with the upper end of the casing 22. The coiled compression spring 4 engaging the cross head 16 forces said head upwardly as the feed within the bag is consumed, thus permitting the horse to obtain the feed, without spilling any due to a movement of the head. By pressing the outer ends of the levers 37 together, the inner curved ends thereof can be opened to release the upper gathered end of the casing, thus permitting of the feed bag being readily removed from the horse's head 11.

What I claim is:—

1. A feed bag comprising a base plate, uprights carried thereby and adapted to have the upper ends thereof suspended from a horse's head, a cross head slidably mounted between said uprights, a bottom plate carried by said cross head, a spiral compression spring interposed between said base plate and said cross head, a casing having the lower end thereof connected to said bottom plate, cylindrical shells arranged within said casing, guide rods supported by said base plate for guiding a movement of said cross head and said casing, and means including curved levers carried by the upper ends of said uprights for clamping the upper end of said casing upon the nose of a horse's head.

2. A feed bag comprising a base plate, uprights carried thereby, a cross head slidably mounted between said uprights, a compression spring interposed between said base plate and said cross head, a feed bag having the bottom thereof supported by said cross head, and means including curved gripping levers carried by the upper ends of said uprights and adapted to retain the upper end of said feed bag in engagement with a horse's nose.

3. A feed bag comprising a base plate, uprights carried thereby, a cross head slidably mounted between said uprights, a compression spring interposed between said base plate and said cross head, a feed bag having the bottom thereof supported by said cross head, means carried by said base plate for supporting said feed bag intermediate the ends thereof, and means including curved pivoted levers carried by the uprights and rack bars adapted to snugly hold the upper end of said feed bag in engagement with a horse's nose.

4. A feed bag comprising a base plate, uprights carried thereby, a bag arranged between said uprights, a spring carried by said base plate for normally holding the bottom of said bag in an elevated position, and means including pivoted levers and coupling members supported by the upper ends of said uprights and adapted to snugly hold the upper end of said bag in engagement with a horse's nose.

In testimony whereof I affix my signature in the presence of two witnesses.

JOSEPH REGECZI.

Witnesses:
JOHN INOCTYISIN,
MIKE RAKACKI.

Copies of this patent may be obtained for five cents each, by addressing the "Commissioner of Patents, Washington, D. C."